United States Patent [19]

Killen

[11] Patent Number: 4,481,649
[45] Date of Patent: Nov. 6, 1984

[54] TEST COUNTER

[76] Inventor: Samuel R. Killen, Rte. 2, Box 238-0, Palmyra, Va. 22962

[21] Appl. No.: 355,146

[22] Filed: Mar. 5, 1982

[51] Int. Cl.³ .................... H03K 21/18; H03K 21/30
[52] U.S. Cl. .......................... 377/19; 377/16; 377/112; 328/129.1
[58] Field of Search ............ 377/6, 16, 20, 118, 377/13, 15, 19, 112; 328/129.1

[56] References Cited

U.S. PATENT DOCUMENTS

| | | | |
|---|---|---|---|
| 3,603,769 | 9/1971 | Malcolm | 377/26 |
| 3,644,718 | 2/1972 | Osborne et al. | 377/24 |
| 3,688,092 | 8/1972 | Shlisky | 377/19 |
| 4,366,373 | 12/1982 | Metcalf | 377/15 |

Primary Examiner—John S. Heyman
Assistant Examiner—N Biase
Attorney, Agent, or Firm—Cushman, Darby and Cushman

[57] ABSTRACT

A test counter for testing demand recorders installed at remote field locations. A predetermined interval of time is established and pulses generated by an attached demand recorder are automatically counted for that interval of time. The counter includes multiple counting channels and an additional channel providing a visual indication of the presence of pulses at an input of that additional channel.

1 Claim, 3 Drawing Figures

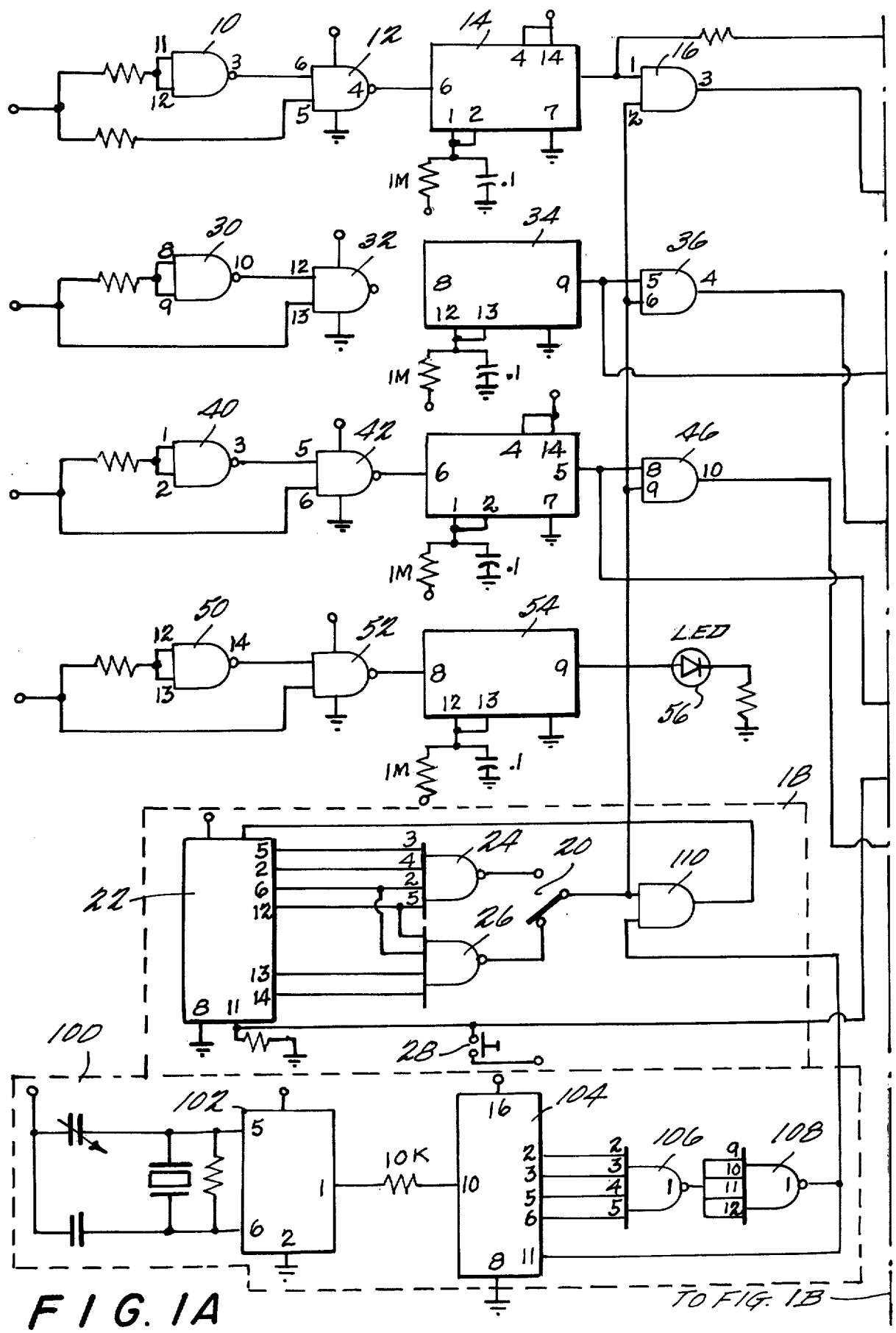
FIG. IA

FROM FIG. 1A

TEST COUNTER

BACKGROUND OF THE INVENTION

This invention relates generally to test equipment that is used in conjunction with demand recorders. More specifically, this invention is directed to a test counter intended for use for demand recorders which accumulate data related to a power distribution network at a remote field installation such as the Westinghouse WR-2C and WR-4C demand recorders. These recorders are used to collect data over an extended period of time at a field installation and preserve that data for later analysis.

Demand recorders are utilized under a variety of circumstances. As an example, power companies utilize demand recorders to measure and accumulate data relating to various environmental parameters so that anomalies that may occur on a power grid can be correlated with physical phenomena. This type of information can be used to advantage in determining problem areas within a power network or the effect of various environmental parameters. Typically, a demand recorder is installed at a field location remote from a central facility. The recorder is operated over an extended period of time converting analog data into digital pulses. These pulses are recorded on a magnetic tape cartridge. After a predetermined number of days such as, for example, 15 days, the cartridge is extracted by service personnel and replaced with a blank one. The extracted cartridge is taken to the central facility where the data previously recorded is read from the magnetic cartridge and processed into a form meaningful to a human. Specifically, information stored on the tape is in the form of pulses recorded during various predetermined intervals of time. In processing the data at the central facility, the cartridge tapes are played (read) and the number of pulses occurring during predetermined intervals of time are counted. In doing so, analog data originally used to generate the pulses is reconstituted. One problem with this type of demand recording and reading is that there is a lengthy time period covered by the data accumulation and processing procedures. There is no instant feedback to any service personnel indicating when a demand recorder is not properly functioning. It may become apparent upon playback of the data that a demand recorder had not functioned properly over a 15 day period. However, once having learned this, it is impossible to go back and accumulate the data that has been lost by the malfunction. Therefore, it has become common practice with service personnel to make periodic checks of the demand recorders using equipment known as a test counter. Test counters in common use, when attached to a demand recorder, verify that pulses are being recorded. Furthermore, they correlate the number of pulses recorded during a predetermined time interval with a particular analog parameter being measured and represented by those pulses. This insures that there is a desired proportional relationship between the number of pulses and the parameter of interest.

Test counters in common use suffer various operational disadvantages. For example, they are capable of measuring pulse data on only one channel at a time. In some monitoring situations, a plurality of demand recorders are utilized to collect and preserve data. In order to test the demand recorder installation, it would be necessary to attach the test counter to each of the demand recorders for an interval of time, such as 15 minutes and count the pulses recorded. For example, where four demand recorders are installed, the test counter must first be attached to the first counter and allowed to record pulses being generated for 15 minutes. Then, service personnel must detach the test counter from the first demand recorder, read the accumulated count, reset the test counter and then attach it to the second demand recorder. The test counter must then remain attached for a predetermined interval of time such as 15 minutes to count the number of pulses generated and being recorded on the second demand recorder. Then service personnel must detach the test counter from the second demand recorder and attach it to the third, etc. The required service time is even further increased when multiple channels on each demand recorder are utilized. Typically, for an installation using four demand recorders, each having three channels, it would take approximately three hours to test the entire installation, assuming a 15 minutes count time for each channel. It is possible to reduce this time somewhat by using multiple test counters simultaneously. However, the field installations are usually at remote locations and it is difficult to carry very much test equipment to a particular remote installation. Thus, there is a trade-off between the amount of equipment to be hauled to a remote location and the time it takes to conduct a test.

Another disadvantage with the operation of conventional test counters is that they require the attention of the operator during a test. It is necessary for the operator to start the test counter and then to stop it after a predetermined period of time has run. If the operator does not stop the recordation at the predetermined time, the test results will be inaccurate. The information is carried in the form of pulses per unit time. Therefore, the unit time must be controlled. Thus, service personnel must stop and start the counter for each channel of each demand recorder. This requires a significant amount of attention on the part of service personnel and prevents them from carrying any other tasks at the field installation.

SUMMARY OF THE INVENTION

Therefore, the present invention provides a test counter that overcomes the various operational disadvantages associated with conventional test counters. Specifically, the test counter of the present invention provides the following operational advantages:

1. The specific circuit arrangement of the test counter of the present invention permits counting at a faster rate than conventional test counters. This allows the time required for each counting process to be shortened.

2. The specific structural design utilizes less power than conventional counters. This offers a significant advantage for portable equipment. It is possible to utilize a smaller battery to achieve a given counting duration. The equipment can be made less bulky and easier for service personnel to carry into the field.

3. The test counter is completely electronic. There are no mechanical parts to wear or jam as in conventional structures.

4. It includes an internal timer with an automatic shut-off operation. This frees an operator to do other tasks because he is no longer obligated to monitor the time and shut off the counter to achieve an accurate count.

5. The test counter includes multiple channels so that multiple demand recorders or multiple channels of a similar demand recorder can be tested simultaneously.

The test counter includes three separate and distinct channels, each having an input for connection to one or more demand recorders. Each channel includes means for gating pulses generated by the demand recorder for a predetermined time that is automatically controlled. These pulses are gated into a counting circuit which counts the number of pulses for the gated interval. The pulse count is latched and displayed by a four digit light emitting diode display. The test counter includes a time delay circuit that provides a presettable delay time from 1 to 15 minutes based upon the setting of a front panel switch and various internal strap interconnections.

The counter also includes a "forth" channel for providing a visual indication by a flashing LED when its input is coupled to a pulse source.

BRIEF DESCRIPTION OF THE DRAWINGS

The construction details of a preferred embodiment of the invention will be described with reference to FIGS. 1 and 2 wherein FIGS. 1A and 1B combined are a schematic diagram of the test counter according to the present invention.

DETAILED DESCRIPTION OF THE PREFERRED EMBODIMENT

Figure 1B:
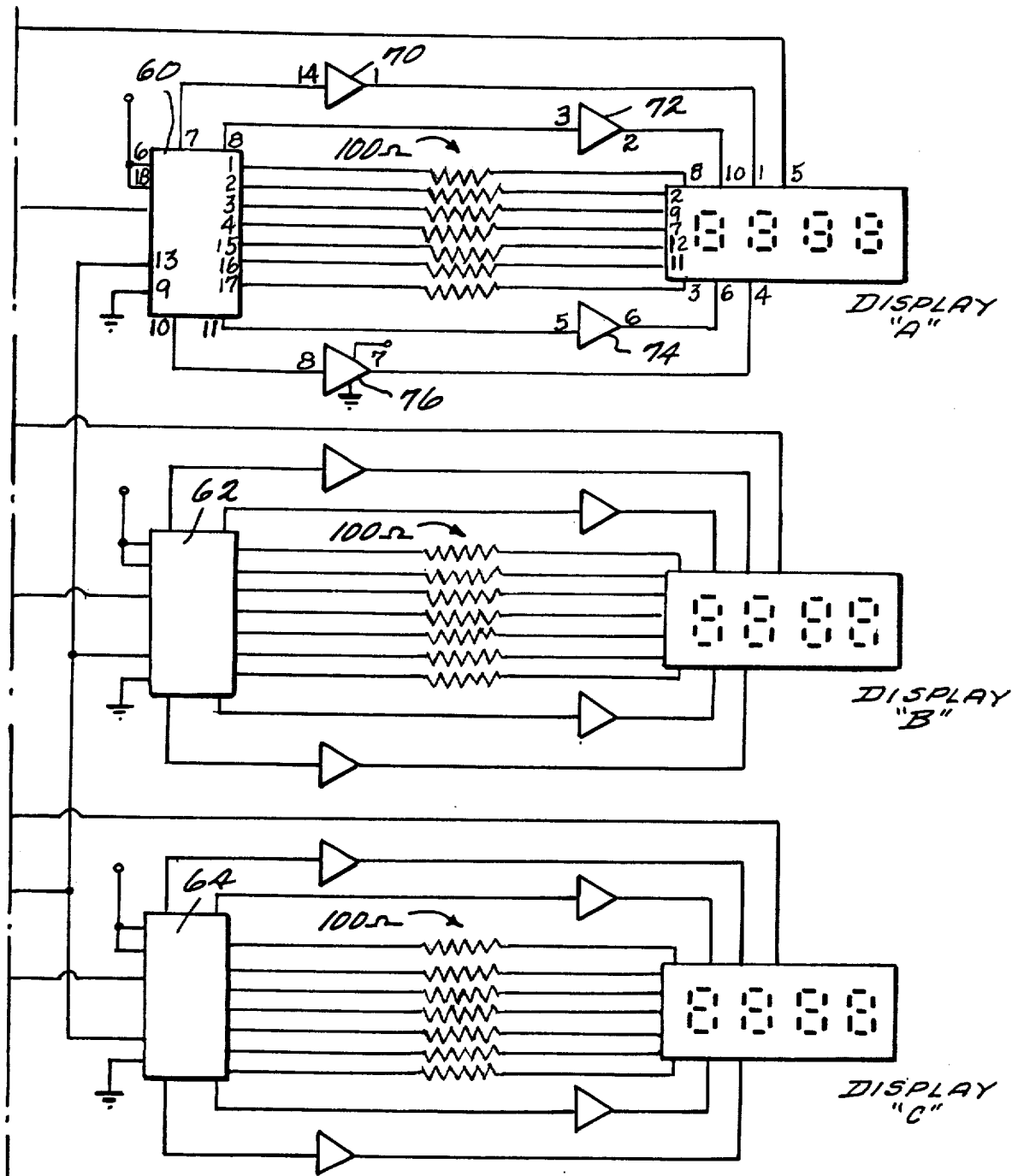

Referring now to FIG. 1 (including FIGS. 1A and 1B), there is shown a schematic diagram of the test counter according to the present invention. Three (3) counting channels have inputs labeled respectively "A", "B", and "C". A fourth channel input is labeled with reference numeral "T". Each of channels "A", "B" and "C" actually count the pulses coupled to their respective inputs for a predetermined period of time. The "T" channel does not count pulses but rather includes a light emitting diode that flashes at a human-readable rate in the presence of pulses coupled to the "T" input. Thus, the "T" channel provides a quick indication to service personnel that pulses are being produced by a demand recorder. The "T" channel input can be coupled easily and quickly through a probe to an output channel of a demand recorder and a visual indication will immediately indicate whether pulses are being produced by the demand recorder.

The channel "A" input is coupled through a 10k resistor to both inputs of a NAND gate 10. The output of gate 10 is coupled to a first input of a NAND gate 12. The second input of NAND gate 12 is coupled through a 10k resistor to input "A". A suitable gate chip for gates 10 and 12 is the 4011. Gates 10 and 12 provide an advantageous way of processing pulse signals from a demand recorder. These pulse signals are typically AC signals superimposed on a DC level that may vary above and below zero (0) volts. There is produced at the output of gate 12 a pulse each time the input signal at A crosses the "0" voltage level.

The output of gate 12 is coupled to one input of a pulse processing circuit 14. Circuit 14 can be part of an LM556 (a dual version of an LM555 timer). Circuit 14 is wired with appropriately valued external components to provide at an output thereof a pulse of predetermined duration responsive to input pulses coupled to it from gate 12. In essence, circuit 14 acts like a Schmitt-trigger to "debounce" the signal output of gate 12. Preferably, circuit 14 is wired to produce pulses of 1-2 msec.

The output of circuit 14 is coupled to a first input of an AND gate 16, a second input of which is coupled to the output of a time-delay circuit 18. Time delay circuit 18 provides a signal defining a five or fifteen minute time delay for carrying test measurements. These two different time periods are switch selectable by a switch 20 mounted on the front panel of the test counter. The time-delay signal is created by the operation of timer circuit 22. Timer circuit 22 is advantageously selected to be a 4040 binary counter (divider) integrated circuit. Various outputs of timer circuit 22 are coupled to gate 24 and 26 as shown in the schematic diagram. The specific times that can be switch selected, such as five minutes and fifteen minutes are determined by the particular connections between circuit 22 and gates 24 and 26. Of course, if desired, different interconnections can be made and time delays other than five and fifteen minutes can be obtained. Time delay circuit 18 also includes a start/reset switch 28 for beginning a new counting cycle.

Channels "B" and "C" are identical to channel "A" previously described. Channel "B" includes gates 30 and 32, pulse processing circuit 34 and gate 36 which gates pulses from circuit 34 responsive to time delay circuit 18. Channel "C" includes gates 40 and 42 coupling pulses to pulse processing circuit 44. Pulses from circuit 44 are gated by gate 46 responsive to time delay circuit 18.

Channel "T" is similar to channels "A", "B" and "C" in that it includes gates 50 and 52 (corresponding to gates 10 and 12 of channel "A") and a pulse processing 54. However, for channel "T", pulses from circuit 54 are not gated but rather are coupled to a light emitting diode 56 to provide a visual indication of the presence of pulses at the "T" input.

For channels "A", "B" and "C", pulses gated respectively by gates 16, 36 and 46 are coupled to counter/decoder/driver circuits 60, 62 and 64 respectively. Circuits 60, 62 and 64 are advantageously selected to be 74C926 integrated circuits. Circuits 60, 62 and 64 count the pulses gated by gates 16, 36 and 46 respectively and develop the signal information for displays A, B and C respectively. For channel A, digit drivers 70, 72, 74 and 76 turn "on" and "off" the four elements of display A. Corresponding digit drivers are provided for channels "B" and "C".

A clock circuit 100 provides clock pulses for time-delay circuit 18. The clock circuit includes a crystal oscillator circuit including an integrated circuit 102. Circuit 102 is advantageously selected to be a 5369 integrated circuit oscillator providing a 60 Hz output signal. The output of circuit 102 is coupled to an input of a counter integrated circuit 104 which is advantageously selected to be a 4040 binary counter (ripple counter) integrated circuit. The output of circuit 104 is coupled via gates 106 and 108 to an input of a gate 110 within time-delay circuit 18. Gates 106 and 108 provide a 1 pulse per second output for clock circuit 100 providing a time base for time delay circuit 18.

By attaching an input A, B or C to an output channel of a demand recorder, pulses are shaped, gated and counted for either 5 or 15 minutes. The pulses counted by circuits 60, 62 and 64 are displayed by displays A, B and C to give a visual indication of the number of pulses counted during the preset time interval.

Figure 2:
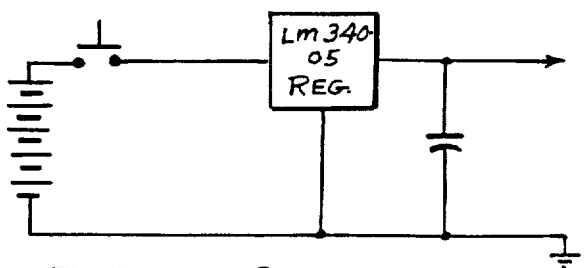
FIG. 2 is a battery supply for powering the operational circuits of the test counter.

Referring to FIG. 2 there is shown a regulated battery power supply used for powering the various integrated circuits shown in the schematic diagram of FIG. 1A. This power supply provides the five volts required for many of the integrated circuits. Of course, using the principles of the present invention, other types of circuits could be utilized and appropriate power supply voltage levels selected. The preferred embodiment as illustrated and discussed provides a TTL compatible test counter. By selecting other types of circuits and other voltage levels, different logic compatibilities can be achieved.

While the invention has been described in connection with what is presently considered to be the most practical and preferred embodiments is to be understood that the invention is not to be limited to the disclosed embodiments but on the contrary is intended to cover various modifications and equivalent arrangements included within the spirit and scope of the appended claims which scope is to be accorded the broadest possible interpretation so as to encompass all such modifications and equivalent structures.

What is claimed:

1. A test counter for testing a pulse producing device comprising:
   timer circuit means for defining a predetermined interval of time over which pulses are to be counted;
   a pulse counting channel input circuit for receiving pulses from the pulse producing device and processing the received pulses, the pulse counting channel input circuit including
   an input terminal,
   a first gate having all of its inputs coupled to the input terminal and having an output,
   a second gate having a first input coupled to the output of the first gate, a second input coupled to the input terminal and an output, and
   a pulse producing circuit, having an input coupled to the output of the second gate, for supplying processed pulses;
   means for gating the processed pulses from said pulse producing circuit of said pulse counting channel for the interval of time established by the timer circuit means;
   a counter for counting the pulses gated by the pulse counting channel input circuit; and
   display means for displaying the count of the counter.

* * * * *